United States Patent
Lea et al.

(10) Patent No.: US 6,367,941 B2
(45) Date of Patent: Apr. 9, 2002

(54) ILLUMINATION DEVICE FOR PRODUCING PREDETERMINED INTENSITY PATTERNS

(75) Inventors: Michael Charles Lea, Bracknell (GB); David Jon Lundin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/876,001

(22) Filed: Jun. 7, 2001

Related U.S. Application Data

(63) Continuation of application No. 09/256,860, filed on Feb. 24, 1999, now abandoned.

(51) Int. Cl.[7] .............................................. F21V 8/00
(52) U.S. Cl. ...................... 362/31; 362/551; 385/129; 385/901
(58) Field of Search ............................ 362/26, 31, 551, 362/559, 560, 561, 582; 349/62, 65; 385/31, 123, 129, 901

(56) References Cited

U.S. PATENT DOCUMENTS

| | | | |
|---|---|---|---|
| 4,765,701 A | 8/1988 | Cheslak .................... 362/560 |
| 4,811,172 A | 3/1989 | Davenport et al. ......... 362/511 |
| 4,868,718 A | 9/1989 | Davenport et al. ......... 362/511 |
| 4,949,227 A | 8/1990 | Finch et al. ................ 362/511 |
| 5,222,794 A | 6/1993 | Windross ................... 362/554 |
| 5,339,179 A | * 8/1994 | Rudisill et al. ............... 349/65 |
| 5,432,876 A | 7/1995 | Appeldron et al. ........... 385/31 |
| 5,485,291 A | * 1/1996 | Qiao et al. .................... 349/62 |
| 5,584,556 A | * 12/1996 | Yokoyama et al. ........... 362/31 |
| 5,631,994 A | 5/1997 | Appeldorn et al. ......... 385/147 |
| 5,659,643 A | 8/1997 | Appeldorn et al. ........... 385/31 |
| 5,845,038 A | 12/1998 | Lundin et al. .............. 385/901 |
| 5,980,054 A | * 11/1999 | Fukui et al. .................. 362/31 |
| 5,987,199 A | * 11/1999 | Zarian et al. ................. 385/31 |
| 6,077,462 A | 6/2000 | Lundin et al. ............. 264/1.24 |
| 6,234,656 B1 | 5/2001 | Hosseini et al. ............ 362/556 |

FOREIGN PATENT DOCUMENTS

| | | |
|---|---|---|
| EP | 0594089 A1 | 4/1994 |
| WO | WO96/17207 | 6/1996 |
| WO | WO98/33008 | 7/1998 |

OTHER PUBLICATIONS

Lawson, et al. "Fiber–Optic Lamp," IBM Technical Disclosure Bulletin, vol. 24, No. 3, Aug. 3, 1981, pp. 1347–1348, XP002127584, New York.

* cited by examiner

Primary Examiner—Alan Cariaso
(74) Attorney, Agent, or Firm—Stephen C. Jensen

(57) ABSTRACT

An illumination device produces a desired illumination pattern by tailoring the configuration of individual light extraction structures. At least two of the light extraction structures have different configurations from one another. The illumination device includes a light guide having a light guide core and an optically smooth surface for propagating light through the core. A light emitting region extends along a portion of the core and includes a plurality of light extraction structures distributed along the optically smooth surface. The light extraction structures are configured so that light reflected therefrom is emitted from the light guide through the optically smooth surface.

15 Claims, 6 Drawing Sheets

ILLUMINATION DEVICE FOR PRODUCING PREDETERMINED INTENSITY PATTERNS

CROSS-REFERENCE TO RELATED APPLICATIONS

This is a continuation of U.S. application Ser. No. 09/256,860, filed Feb. 24, 1999, now abandoned, and which is incorporated herein by reference.

BACKGROUND OF THE INVENTION

The present invention relates generally to an illumination device, and more particularly, to a light guide illumination device in which light extraction structures are configured to produce a predetermined intensity pattern such as for use in a vehicle.

Optically transmissive materials, such as glass or polymers may be used as light guides to propagate light. A light guide typically includes at least one surface adapted to receive light from a light source and an optically smooth surface for reflecting light propagating through or along the light guide. Common examples of light guides include optical fibers traditionally used in the data communication industry and more recently light fibers used for illumination purposes. For example, U.S. Pat. No. 5,432,876 (the '876 patent) discloses one such illumination device employing light fibers. In this device, light may be injected into at least one end of a light fiber and allowed to exit the fiber at a predetermined position or positions along the length of the fiber to produce an even illumination pattern. Light extraction structures or notches are formed in the core of the light fiber. The extraction structures define first and second reflecting surfaces, which reflect in a radial direction a portion of the light propagating axially through the fiber. The reflected light is directed at an angle that is less than the critical angle necessary for continued propagation along the fiber according to the principle of total internal reflection. As a result, the reflected light is extracted from the fiber. In contrast to prior techniques such as subjecting the fiber to relatively sharp bends, this system extracts light from the fiber in a controlled fashion.

Light fiber illumination devices have been proposed for use in automobiles and other vehicles. For example, they can be used to evenly distribute a point light source into a long, narrow line that may be employed in spoilers, along the edges of rear windows, or to follow the curve of a trunk lid. Examples of such devices may be found, for example, in U.S. Pat. Nos. 5,222,794, 4,811,172, 4,868,718, and 4,949,227.

Light fiber illumination devices can also be used as side markers, emergency flashers, and center high mounted stop lamps, which can serve as indicators of a vehicle's features such as its overall length, width, and height. These devices often must meet specified standard requirements. For example, the Society of Automotive Engineers (SAE) sets forth a variety of different standards that recommend performance requirements for vehicle illumination devices, which define the amount, direction and distribution of light that the device should produce. For example, certain devices are required to provide light output over an angular range as large as +/−45 degrees for minimum vehicle conspicuity.

These requirements are often difficult or impossible to achieve with known light fiber illumination devices because they produce a limited set of intensity distributions which do not generally conform with any particular prescribed standard (i.e., SAE, etc.). This limitation arises because devices known in the art comprise light extraction structures that vary only in spacing and depth.

The present invention is therefore directed to the problem of providing an illumination device with light extraction structures that are appropriately configured to produce a predetermined illumination pattern, for example, one that may be uniform over a range of angles or that has a peak intensity at a given angle.

SUMMARY OF THE INVENTION

The present invention solves this problem by providing a light guide illumination device that has differently configured light extraction structures. A desired illumination pattern is achieved by individually tailoring the notch angle of each light extraction structure.

The present invention provides an illumination device that includes a light guide having a light guide core and an optically smooth surface for propagating light through the core. A light emitting region extends along a portion of the core and includes a plurality of light extraction structures distributed along the optically smooth surface. The light extraction structures are configured so that light reflected therefrom is emitted from the light guide through the optically smooth surface. At least two of the light extraction structures have different configurations from one another.

In one aspect of the invention, each light extraction structure includes an optically reflective surface extending into the light guide core and oriented at a notch angle to reflect light at an angle less than a critical angle so that light is emitted from the light guide through the optically smooth surface. The notch angle denotes the angle between the optically reflective surface and the axis perpendicular to the optically smooth surface.

In another aspect of the invention, the different configurations of the light extraction structures correspond to different notch angles.

In accordance with yet another aspect of the invention, the light guide may be a light fiber. Additionally, the light guide may have a circular or noncircular cross-sectional shape, and may even be a planar waveguide.

In accordance with another aspect of the invention, the plurality of light extraction structures have different configurations selected so that the emitted light forms a prescribed illumination pattern. The prescribed illumination pattern may be, for example, substantially uniform over an angular distribution of +/−45 degrees, or may be substantially non-uniform by providing relatively more intense light over an angular distribution of no more than about +/−10 degrees. "Angular distribution" is defined in relation to an essentially linear illumination device such as a light fiber, and means the distribution of light rays as a function of angle to some fixed direction. In the present case, light is emitted opposite from the side in which light extraction structures are formed, and this is defined as the direction of zero angle. Furthermore, this invention is primarily concerned with the angular distribution in the plane that contains the zero angle direction as well as the fiber axis. In addition to providing an illumination source that has pre-defined intensity levels when viewed by an observer, the prescribed illumination pattern may illuminate a target in a uniform or non-uniform manner. Therefore, available light is distributed efficiently to a target or to satisfy a prescribed standard. When employed as a vehicular illumination device, the prescribed illumination pattern may conform to an established standard for a vehicular illumination device.

In accordance with another aspect, the plurality of light extraction structures may be equally spaced apart from one another along the optically smooth surface. Alternatively, the plurality of light extraction structures may be unequally spaced apart from one another along the optically smooth surface.

In accordance with another aspect, the plurality of light extraction structures may be distributed along a plurality of longitudinal axes of a light guide. Preferably, a light guide in the form of a light fiber having two longitudinal axes may have light extraction structures having unequal notch angles and/or uneven notch spacing distributed along the axes.

In one particularly advantageous embodiment, the light guide is formed from a polymerizable material such as an acrylate, silicone, or urethane material.

DETAILED DESCRIPTION

Light Guide Illumination Device

Figure 1:
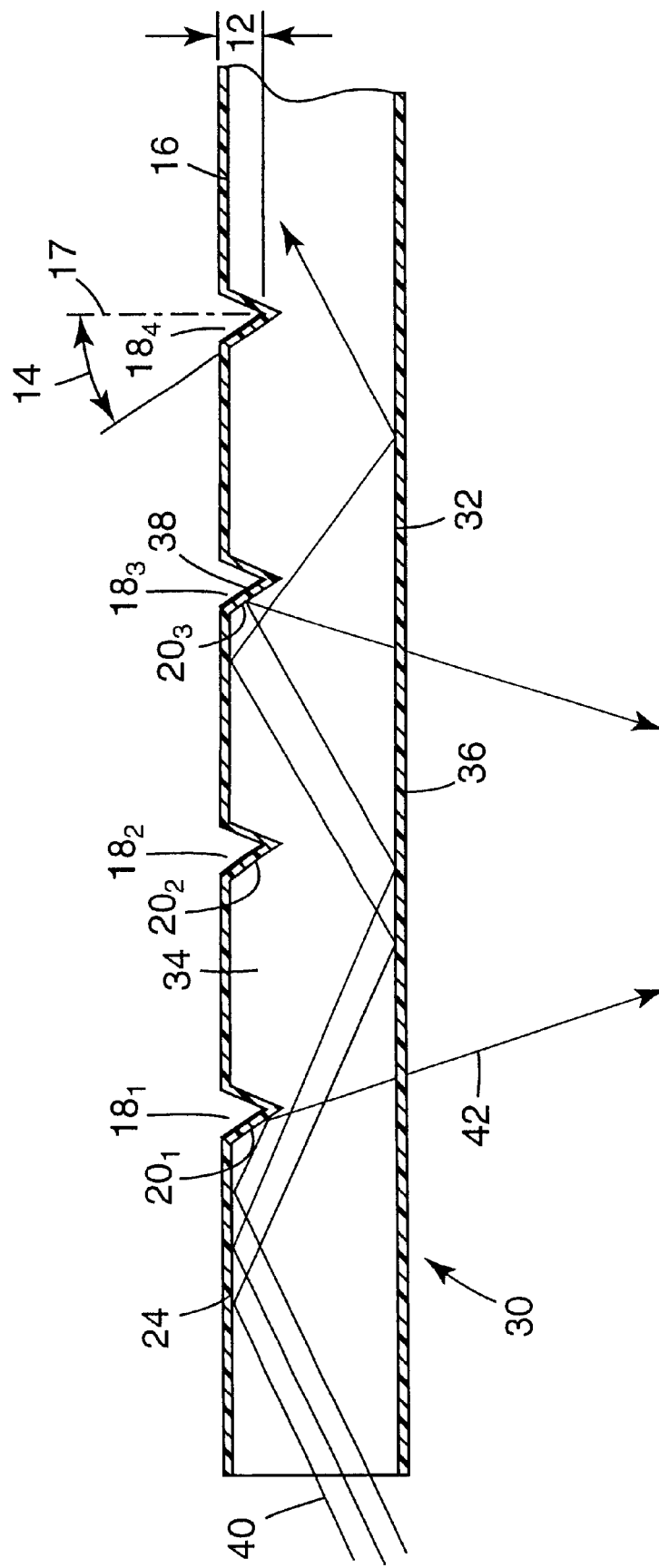
FIG. 1 is a schematic, cross-sectional view of a known illumination device illustrating the operation of the light extraction structures.

FIG. 1 depicts a side view of a portion of a known illumination device. The illumination device is formed from a light guide 30 having a circumferential surface 16 that includes one or more light extraction structures $18_1$, $18_2$, $18_3$, . . . formed therein. Typically, light guide 30 further comprises core 34 having a surrounding cladding 36. Each extraction structure includes at least one optically smooth surface $20_1$, $20_2$, $20_3$, . . . . In operation, light ray 40 strikes a portion 24 of circumferential surface 16 not occupied by a light extraction structure 18, where it is reflected back into the light guide at an angle greater than the critical angle of the light guide, and accordingly, continues to propagate along the fiber. By contrast, light ray 42 strikes an optically smooth surface $20_1$ of light extraction structure $18_1$, which reflects light ray 42 into light guide 30 at an angle which is less than the critical angle necessary for continued propagation along light guide 30. Light ray 42 is thereby transmitted through opposite surface 32 of light guide 30 at a position opposed to the location of extraction structures $18_1$. In one exemplary embodiment of the present invention, cladding 36 covering optically smooth surfaces $20_1$, $20_2$, $20_3$, . . . is coated with reflective material 38 such as aluminum or silver, for example, to reflect light of less than the critical angle that may be otherwise lost through surfaces $20_1$, $20_2$, $20_3$, . . . .

The configuration of light extraction structures 18 may be characterized in terms of their depth 12 into light guide 30 and notch angle 14 formed between surface 20 and axis 17 normal to surface 16. Notch angle 14 determines the direction of the light transmitted through surface 32 of light guide 30. Known light guide illumination devices employ light extraction structures having uniform notch angles. However, this arrangement limits the variations in the illumination pattern that the devices can produce.

The present invention overcomes the limitations of known illumination devices by providing a series of light extraction structures with different notch angles. That is, in the present invention, the angles 14 of light extraction structures 18 are not all the same. Rather, in accordance with the present invention, the notch angles are individually tailored for each extraction structure so that the illumination device provides the desired illumination pattern by integrating the light from different light extraction structures.

Figure 2:
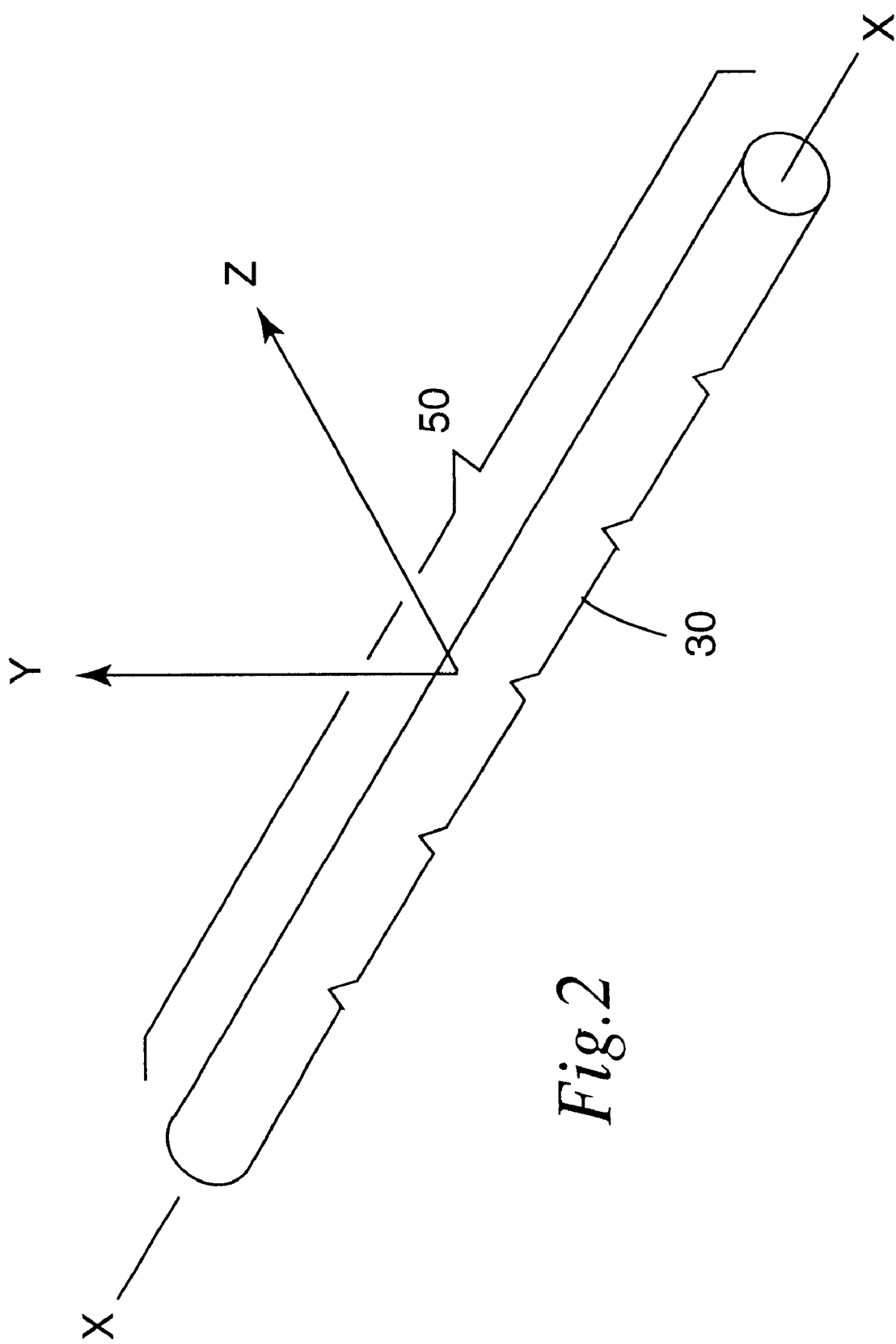
FIG. 2 is a perspective view of the light guide shown in FIG. 1.

FIG. 2 shows a perspective view of the light guide illumination device shown in FIG. 1. For purposes of discussion, the longitudinal axis of light guide 30 will be defined as extending in the horizontal or x direction. Therefore, angular distribution of light, as defined above, is measured in the +/−x direction. The y direction will be defined as the vertical direction, which denotes points above and below the illumination device. Therefore, radial distribution of light is measured in the +/−y direction. The z direction, therefore, defines the direction in which light is emitted and the luminous intensity of the device is measured as a function of an angle from the z direction, in the x-z plane, as depicted by trace 50 of FIG. 2. Thus, the illumination device will emit light so that it forms an illumination pattern in the x-z plane.

As previously mentioned, vehicular illumination devices must often meet standards that set forth stringent specifications for the illumination pattern that they produce. For example, some devices are required to produce an illumination pattern in the x-z plane that is relatively narrowly confined in the vertical (y) direction but which provides roughly uniform intensity in the horizontal (x) direction. For example, one particular illumination device, which is employed as a vehicle side marker, requires that the intensity of the light in the horizontal direction should be roughly uniform over +/−45 degrees. An illumination device having a series of uniformly configured light extraction structures will not yield such an intensity pattern. However, the present invention discloses that many different intensity patterns may be produced by providing a series of light extraction structures that have different configurations. Specifically, the invention teaches that by providing a plurality of light extraction structures having several different notch angles the intensity pattern can be tailored for a given application. That is, in the present invention the notch angle now becomes an adjustable parameter that can be varied to produce desired illumination patterns. For example, FIG. 3 shows an embodiment of the present invention that yields the requisite intensity pattern for the previously mentioned vehicle side marker.

While the particular embodiments of the invention shown in FIG. 3 and described below are formed from a light fiber, it should be recognized that the present invention is not limited to light fibers but rather is applicable to any form of light guide. Moreover, the light guides need not have a circular cross-section, but rather may have any desired shape. For example, in some embodiments the present invention contemplates the use of planar waveguides.

Figure 3:
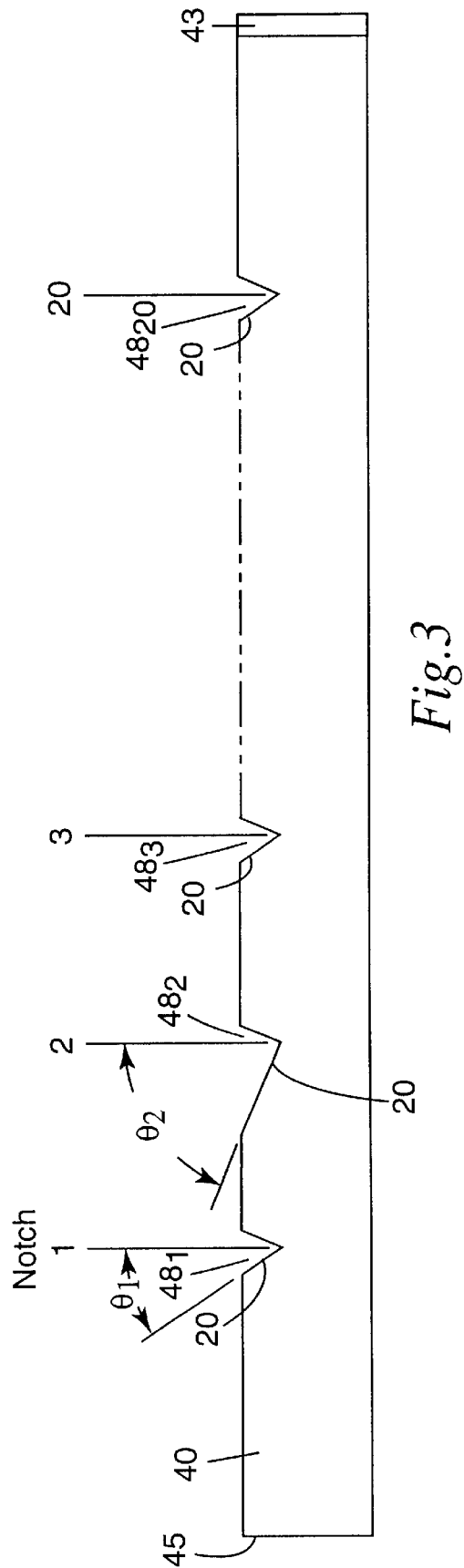
FIG. 3 is a schematic, plan view of an illumination device constructed in accordance with the present invention.

The illumination device shown in FIG. 3 employs a light fiber 40 that is 100 mm in length on which twenty light extraction structures $48_1$, $48_2$, $48_3$, . . . $48_{20}$ are disposed. The diameter of light fiber 40 is 7 mm. Six differently configured light extraction structures are employed, which extend along the light fiber in a given sequence that is repeated in full three times. As tabulated in Table 1, the notch angles $\theta_1, \theta_2, \theta_3, \ldots \theta_{20}$ formed between the surface 20 and the normal direction 17 for extraction structures $48_1$, $48_2, 48_3, 48_4, 48_5, 48_6$, are, respectively, 36, 68, 40, 56, 47.5, and 63 degrees. Extraction structures 48 are uniform in depth. The center of the first light extraction structure $48_1$ is located 50 mm from the input end 45 of light fiber 40. The remaining light extraction structures are unevenly spaced apart from one another. Table 1 also shows the location of the center of each extraction structure as measured from the first notch of light fiber 40.

TABLE 1

| Light Extraction Structure | Position From First Notch (mm) | Notch Angle ($\theta$) (degrees) |
|---|---|---|
| $48_1$ | 0.000 | 36 |
| $48_2$ | 6.610 | 68 |
| $48_3$ | 12.964 | 40 |
| $48_4$ | 19.077 | 56 |
| $48_5$ | 24.966 | 47.5 |
| $48_6$ | 30.647 | 63 |
| $48_7$ | 36.134 | 36 |
| $48_8$ | 41.441 | 68 |
| $48_9$ | 46.584 | 40 |
| $48_{10}$ | 51.575 | 56 |
| $48_{11}$ | 56.427 | 47.5 |
| $48_{12}$ | 61.153 | 63 |
| $48_{13}$ | 65.767 | 36 |
| $48_{14}$ | 70.279 | 68 |
| $48_{15}$ | 74.701 | 40 |
| $48_{16}$ | 79.046 | 56 |
| $48_{17}$ | 83.325 | 47.5 |
| $48_{18}$ | 87.548 | 63 |
| $48_{19}$ | 91.728 | 36 |
| $48_{20}$ | 95.875 | 68 |

A reflector 43 may be incorporated at the end of light fiber 40 that is remote from the light source. Any light that is not emitted by one of the light extraction structures 48 upon its initial pass through the light fiber will be reflected so that it has another opportunity to be emitted by a light extraction structure 48. In this way a greater portion of the total light directed into light fiber 40 is used for illumination purposes.

Figure 4:
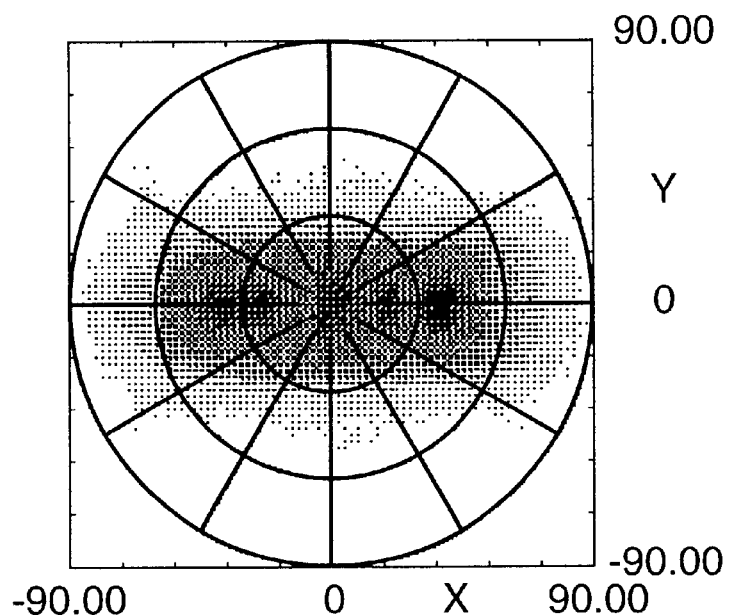
FIG. 4 shows the illumination pattern produced by the illumination device shown in FIG. 3.
Figure 5:
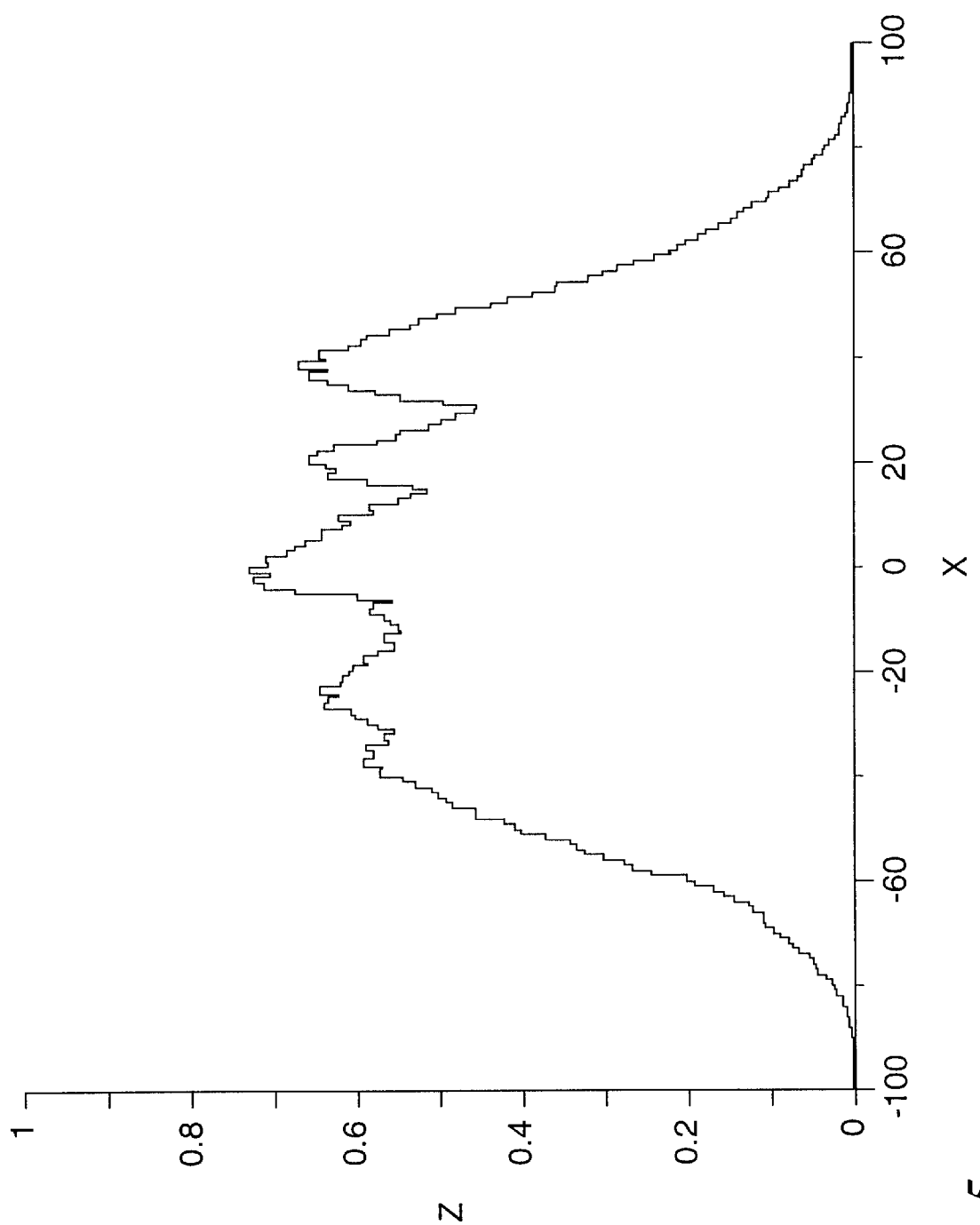
FIG. 5 shows the intensity distribution in the horizontal direction produced by the illumination device shown in FIG. 3.

FIG. 4 shows the illumination pattern produced in the x and y directions by the illumination device shown in FIG. 3. FIG. 5 shows a graph of the light intensity vs. angle to the z direction (in the x-z plane) produced by the same device. As FIG. 5 indicates, the intensity is roughly uniform over an angular range of about +/−45 degrees. In the y (or vertical) direction, the intensity is concentrated within an angular range of about +/−15 degrees.

Another embodiment of the present invention may be used as an emergency flasher for a vehicle. The intensity pattern for the emergency flasher as set forth by the Society of Automotive Engineers should be narrowly focused in the y (or vertical) direction with a peak intensity that extends over a relatively narrow angle in the x (or horizontal) direction. The emergency flasher employs a light fiber that is 400 mm in length and 6.35 mm in diameter on which 200 light extraction structures are disposed. Four differently configured light extraction structures are employed. Table 2 shows the notch angles formed between the surface of the light guide and the normal direction for each of the extraction structures. The extraction structures are uniform in depth. Table 2 also shows the location of the center of each extraction structure as measured from the first notch of light fiber referred to in Example 2 as notch 0. As in the previously discussed embodiment of the invention, a reflector may be incorporated at one end of light fiber so that a greater fraction of the light directed into the light fiber appears in the resulting illumination pattern.

TABLE 2

| Notch No. | Distance from 1st notch, mm | Notch angle, deg. |
|---|---|---|
| 0 | 0.000 | 49 |
| 1 | 3.844 | 55 |
| 2 | 7.655 | 36 |
| 3 | 11.433 | 49 |
| 4 | 15.179 | 55 |
| 5 | 18.893 | 49 |
| 6 | 22.576 | 55 |
| 7 | 26.226 | 45 |
| 8 | 29.846 | 49 |
| 9 | 33.435 | 55 |
| 10 | 36.994 | 49 |
| 11 | 40.522 | 55 |
| 12 | 44.020 | 36 |
| 13 | 47.489 | 49 |
| 14 | 50.928 | 55 |
| 15 | 54.338 | 49 |
| 16 | 57.720 | 55 |
| 17 | 61.072 | 45 |
| 18 | 64.397 | 49 |
| 19 | 67.694 | 55 |
| 20 | 70.962 | 49 |
| 21 | 74.204 | 55 |
| 22 | 77.418 | 36 |
| 23 | 80.605 | 49 |
| 24 | 83.766 | 55 |
| 25 | 86.900 | 49 |
| 26 | 90.008 | 55 |
| 27 | 93.090 | 45 |
| 28 | 96.147 | 49 |
| 29 | 99.178 | 55 |
| 30 | 102.184 | 49 |
| 31 | 105.165 | 55 |
| 32 | 108.122 | 36 |
| 33 | 111.054 | 49 |
| 34 | 113.961 | 55 |
| 35 | 116.845 | 49 |
| 36 | 119.705 | 55 |
| 37 | 122.542 | 45 |
| 38 | 125.356 | 49 |
| 39 | 128.146 | 55 |
| 40 | 130.914 | 49 |
| 41 | 133.659 | 55 |
| 42 | 136.382 | 36 |
| 43 | 139.083 | 49 |
| 44 | 141.761 | 55 |
| 45 | 144.419 | 49 |
| 46 | 147.054 | 55 |
| 47 | 149.669 | 45 |
| 48 | 152.262 | 49 |
| 49 | 154.835 | 55 |
| 50 | 157.387 | 49 |
| 51 | 159.919 | 55 |
| 52 | 162.430 | 36 |
| 53 | 164.922 | 49 |
| 54 | 167.393 | 55 |
| 55 | 169.845 | 49 |
| 56 | 172.278 | 55 |
| 57 | 174.692 | 45 |
| 58 | 177.087 | 49 |
| 59 | 179.462 | 55 |
| 60 | 181.820 | 49 |
| 61 | 184.159 | 55 |
| 62 | 186.479 | 36 |
| 63 | 188.782 | 49 |
| 64 | 191.067 | 55 |
| 65 | 193.334 | 49 |
| 66 | 195.584 | 55 |
| 67 | 197.816 | 45 |
| 68 | 200.032 | 49 |
| 69 | 202.230 | 55 |

TABLE 2-continued

| Notch No. | Distance from 1st notch, mm | Notch angle, deg. |
|---|---|---|
| 70 | 204.412 | 49 |
| 71 | 206.577 | 55 |
| 72 | 208.726 | 36 |
| 73 | 210.859 | 49 |
| 74 | 212.975 | 55 |
| 75 | 215.076 | 49 |
| 76 | 217.161 | 55 |
| 77 | 219.231 | 45 |
| 78 | 221.285 | 49 |
| 79 | 223.325 | 55 |
| 80 | 225.349 | 49 |
| 81 | 227.358 | 55 |
| 82 | 229.353 | 36 |
| 83 | 231.333 | 49 |
| 84 | 233.299 | 55 |
| 85 | 235.250 | 49 |
| 86 | 237.188 | 55 |
| 87 | 239.112 | 45 |
| 88 | 241.022 | 49 |
| 89 | 242.918 | 55 |
| 90 | 244.801 | 49 |
| 91 | 246.671 | 55 |
| 92 | 248.528 | 36 |
| 93 | 250.371 | 49 |
| 94 | 252.202 | 55 |
| 95 | 254.021 | 49 |
| 96 | 255.827 | 55 |
| 97 | 257.620 | 45 |
| 98 | 259.401 | 49 |
| 99 | 261.171 | 55 |
| 100 | 262.928 | 49 |
| 101 | 264.674 | 55 |
| 102 | 266.408 | 36 |
| 103 | 268.130 | 49 |
| 104 | 269.841 | 55 |
| 105 | 271.541 | 49 |
| 106 | 273.230 | 55 |
| 107 | 274.908 | 45 |
| 108 | 276.575 | 49 |
| 109 | 278.232 | 55 |
| 110 | 279.878 | 49 |
| 111 | 281.514 | 55 |
| 112 | 283.139 | 36 |
| 113 | 284.754 | 49 |
| 114 | 286.360 | 55 |
| 115 | 287.955 | 49 |
| 116 | 289.541 | 55 |
| 117 | 291.117 | 45 |
| 118 | 292.684 | 49 |
| 119 | 294.241 | 55 |
| 120 | 295.790 | 49 |
| 121 | 297.329 | 55 |
| 122 | 298.859 | 36 |
| 123 | 300.380 | 49 |
| 124 | 301.893 | 55 |
| 125 | 303.397 | 49 |
| 126 | 304.893 | 55 |
| 127 | 306.380 | 45 |
| 128 | 307.859 | 49 |
| 129 | 309.330 | 55 |
| 130 | 310.793 | 49 |
| 131 | 312.248 | 55 |
| 132 | 313.696 | 36 |
| 133 | 315.135 | 49 |
| 134 | 316.568 | 55 |
| 135 | 317.993 | 49 |
| 136 | 319.410 | 55 |
| 137 | 320.821 | 45 |
| 138 | 322.224 | 49 |
| 139 | 323.621 | 55 |
| 140 | 325.011 | 49 |
| 141 | 326.394 | 55 |
| 142 | 327.770 | 36 |
| 143 | 329.140 | 49 |
| 144 | 330.504 | 55 |
| 145 | 331.862 | 49 |
| 146 | 333.213 | 55 |
| 147 | 334.558 | 45 |
| 148 | 335.898 | 49 |
| 149 | 337.231 | 55 |
| 150 | 338.559 | 49 |
| 151 | 339.882 | 55 |
| 152 | 341.199 | 36 |
| 153 | 342.510 | 49 |
| 154 | 343.816 | 55 |
| 155 | 345.117 | 49 |
| 156 | 346.414 | 55 |
| 157 | 347.705 | 45 |
| 158 | 348.991 | 49 |
| 159 | 350.273 | 55 |
| 160 | 351.549 | 49 |
| 161 | 352.822 | 55 |
| 162 | 354.090 | 36 |
| 163 | 355.354 | 49 |
| 164 | 356.613 | 55 |
| 165 | 357.868 | 49 |
| 166 | 359.120 | 55 |
| 167 | 360.367 | 45 |
| 168 | 361.611 | 49 |
| 169 | 362.851 | 55 |
| 170 | 364.087 | 49 |
| 171 | 365.320 | 55 |
| 172 | 366.550 | 36 |
| 173 | 367.776 | 49 |
| 174 | 368.999 | 55 |
| 175 | 370.219 | 49 |
| 176 | 371.436 | 55 |
| 177 | 372.650 | 45 |
| 178 | 373.861 | 49 |
| 179 | 375.070 | 55 |
| 180 | 376.276 | 49 |
| 181 | 377.479 | 55 |
| 182 | 378.680 | 36 |
| 183 | 379.879 | 49 |
| 184 | 381.075 | 55 |
| 185 | 382.270 | 49 |
| 186 | 383.462 | 55 |
| 187 | 384.653 | 45 |
| 188 | 385.842 | 49 |
| 189 | 387.029 | 55 |
| 190 | 388.214 | 49 |
| 191 | 389.398 | 55 |
| 192 | 390.580 | 36 |
| 193 | 391.761 | 49 |
| 194 | 392.941 | 55 |
| 195 | 394.120 | 49 |
| 196 | 395.298 | 55 |
| 197 | 396.474 | 45 |
| 198 | 397.650 | 49 |
| 199 | 398.825 | 55 |

Figure 6:
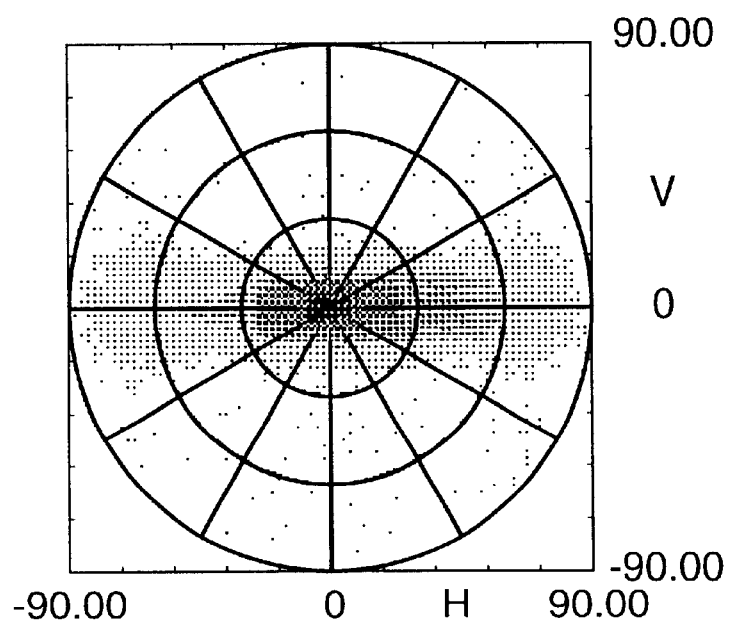
FIG. 6 shows the illumination pattern produced by another embodiment of the inventive illumination device.
Figure 7:
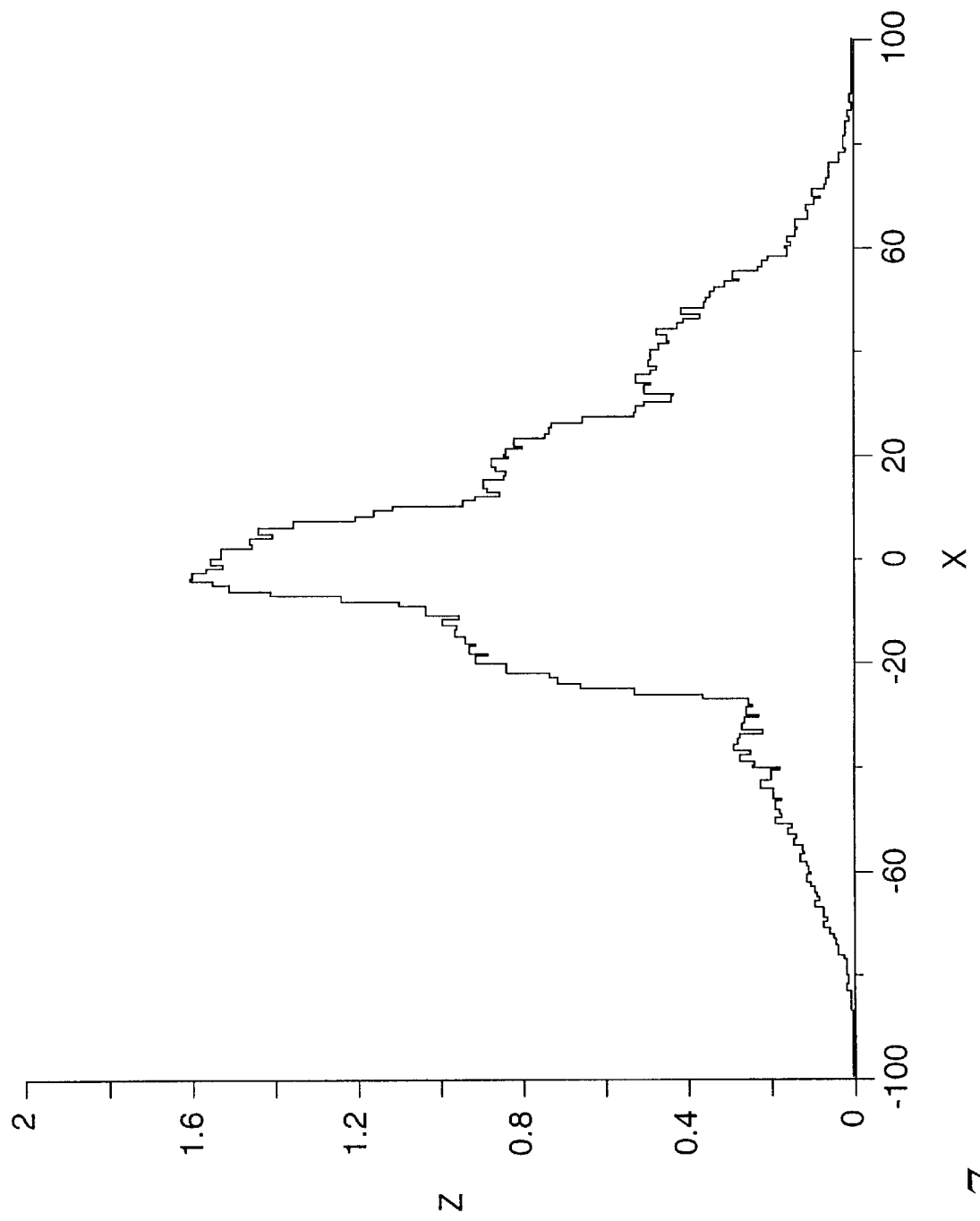
FIG. 7 shows the intensity distribution in the horizontal direction produced by the illumination device employed in FIG. 6.

FIG. 6 shows the illumination pattern produced in the x-y plane by the previously mentioned emergency flasher. FIG. 7 shows a graph of the light intensity vs. angle to the z direction (in the x-z plane) produced by the same device. As FIG. 7 indicates, the peak intensity in the horizontal direction is roughly limited to an angular range of about +/−10 degrees. Advantageously, in the present design, horizontal light distribution extends out to +/−60 degrees, providing added conspicuity of the device.

In general, the illumination device of the present invention encompasses any light guide that has at least two differently configured light extraction structures so that overlapping light rays are integrated together to produce a given illumination pattern. The particular configuration of light extraction structures as well as their arrangement on the light guide will depend on the illumination pattern that is desired. The illumination pattern will in turn generally depend on the application for which the illumination device is to be used. While the configuration and arrangement of the light extraction structures may be empirically determined for any given illumination pattern, the following guidelines may prove helpful in this process.

Light is reflected from any given notch surface in a lobe or cone whose intensity and set of ray angles is determined by the notch angle (e.g., angle 17 in FIG. 1). Lobes of light reflected from adjacent notch surfaces can overlap to some extent and are essentially additive when they overlap. The ray angle distribution from each notch surface contributes to the aggregate far field output results from the illumination device. The design of specific set of notch angles and spacings of an illumination device allows for tailoring of far field output. By 'far field' is meant a distance from the light source of greater than 20 times the size, i.e., length, of the light source.

As previously mentioned, the arrangement of the light extraction structures along the light guide will also be dictated by the desired illumination pattern. For example, the spacing between adjacent light extraction structures need not be constant, but may vary along the light guide. In addition, a series of light extraction structures defined by a particular sequence of notch angles may be repeated one or more times along the light guide. Finally, the light extraction structures can be varied in their depth into the light guide, as described in U.S. Pat. No. 5,432,876, incorporated herein by reference. Variations in notch depth can produce variations in radial (+/−y) distribution of emitted light. Light extraction structures of the present invention may be distributed along a single longitudinal axis of the light emitting region of the light guide, or they may be distributed along more than one longitudinal axis. Light guides having at least two sets of light extraction structures distributed along at least two longitudinal axes of a light guide are described in U.S. Pat. No. 5,845,038, incorporated herein by reference.

Light Guide Illumination Device Fabrication

The illumination device of the present invention may be fabricated by any desired technique. In one method the light extraction structures are directly micro-machined into the light guide itself. In another method, a molding process is employed, which uses a conventional mold such as a two piece mold. Alternatively, the mold may be an expandable mold of the type disclosed in U.S. application Ser. No. 09/026,836, entitled "Method and Apparatus for Seamless Microreplication Using an Expandable Mold." Briefly, an expandable mold is formed from a flexible material having a generally hollow portion that corresponds to the shape of the desired finished article (i.e., the light guide). The hollow portion is accessible through at least one opening. The hollow portion is filled with a curable material that hardens in the shape of the hollow portion of the mold. Once hardened, the finished article is removed by applying a pressure differential between the inside and outside of the mold so that the walls of the mold distend to facilitate removal of the molded article. Additional details concerning the expandable mold may be found in the previously mentioned patent application, which is hereby incorporated by reference in its entirety including the drawings, as if repeated herein.

Regardless of the type of mold that is employed, the curable material that forms the finished article may be any material that hardens into a substantially optically transparent material and which can be introduced into the mold and hardened at temperatures and/or pressure conditions that do adversely affect the mold. The curable material may be curable by heat, radiation, or other known processes. Suitable curable materials include a polymerizable compound or mixture. Acrylates are a class of curable materials that are preferable for their transparency properties. Urethanes are also a desirable class of curable materials because their contraction during curing tends to be minimal, although only certain formulations have desirable transparency properties. Yet another curable material that may be used is silicone.

Other techniques also may be used to fabricate the illumination device of the present invention. For example, U.S. Pat. No. 5,631,994 is directed to a method in which an overlay is provided that incorporates the extraction structures. The overlay, which is formed from an optically transparent substrate, is fabricated by conventional manufacturing processes, such as a molding process. An adhesive backing is applied to the overlay so that it can adhere to the fiber core.

Although various embodiments are specifically illustrated and described herein, it will be appreciated that modifications and variations of the present invention are covered by the above teachings and within the purview of the appended claims without departing from the spirit and intended scope of the invention. For example, while the present invention has been described as being particularly applicable to vehicular illumination devices, one of ordinary skill in the art will recognize that the invention is equally applicable in many other situations where task lighting is required. In particular, the present invention may be used to provide a prescribed illumination pattern that is required by any of the numerous organizations that establish illumination standards.

What is claimed is:

1. An illumination device, comprising:
   a light guide including a light guide core having an optically smooth surface for propagating light therethrough and a light emitting region extending along a portion of the core, the light emitting region including:
   a plurality of light extraction structures distributed along the optically smooth surface of the light guide core, each light extraction structure including an optically reflective surface extending into the light guide core and oriented to reflect light at an angle less than a critical angle so that light is emitted from the light guide through the optically smooth surface, each such optically reflective surface forming a notch angle with respect to an axis that extends from the respective light extraction structure to a side of the optically smooth surface opposite such light extraction structure;
   wherein at least one of the light extraction structures has a notch angle that is different from a notch angle of at least one other light extraction structure; and
   wherein the plurality of light extraction structures include a series of light extraction structures defined by a particular sequence of notch angles, said series of light extraction structures being repeated a prescribed number of times along the optically smooth surface of the light guide core.

2. The device of claim 1, wherein the light guide is a light fiber.

3. The device of claim 2, wherein the light fiber has a circular cross-sectional shape.

4. The device of claim 2, wherein the plurality of light extraction structures are distributed along a plurality of longitudinal axes of the light fiber.

5. The device of claim 1, wherein the plurality of light extraction structures are equally spaced apart from one another along the optically smooth surface.

6. The device of claim 1, wherein the plurality of light extraction structures are unequally spaced apart from one another along the optically smooth surface.

7. The device of claim 1, wherein said light guide is formed from a polymerizable material.

8. The device of claim 7, wherein the polymerizable material is selected from the group consisting of acrylate, urethane, and silicone materials.

9. A method for generating a prescribed illumination pattern, said method comprising the steps of:

providing a light guide that includes a light guide core having an optically smooth surface for propagating light therethrough and a light emitting region extending along a portion of the core, the light emitting region including:

a plurality of light extraction structures distributed along the optically smooth surface of the light guide core, each light extraction structure including an optically reflective surface extending into the light guide core and oriented to reflect light at an angle less than a critical angle so that light is emitted from the light guide through the optically smooth surface, each such optically reflective surface forming a notch angle with respect to an axis that extends from the respective light extraction structure to a side of the optically smooth surface opposite such light extraction structure; and arranging at least first and second notch angles to be different from one another so that light emitted through the optically smooth surface is emitted in the prescribed illumination pattern;

wherein the plurality of light extraction structures include a series of light extraction structures defined by a particular sequence of notch angles, and further comprising the step of repeating a prescribed number of times said series of light extraction structures along the optically smooth surface of the light guide core.

10. An illumination device, comprising:

a light guide including a light guide core having an optically smooth surface for propagating light therethrough and a light emitting region extending along a portion of the core, the light emitting region including:

a plurality of light extraction structures extending along the optically smooth surface of the light guide core, said light extraction structures having an optically smooth reflective surface and being configured so that light reflected therefrom is emitted from the light guide through the optically smooth surface; and wherein at least two of the light extraction structures have different configurations from one another; and wherein each light extraction structure has a notch angle denoting the angle between an optically smooth reflective surface of the light extraction structure and an axis extending from the light extraction structure to a side of the optically smooth surface opposite such light extraction structure, and wherein the plurality of light extraction structures include a series of light extraction structures defined by a particular sequence of notch angles, said series of light extraction structures being repeated a prescribed number of times along the optically smooth surface of the light guide core.

11. The device of claim 10, wherein the optically smooth reflective surface for each light extraction structure extends into the light guide core and is oriented at the respective notch angle to reflect light at an angle less than a critical angle so that light is emitted from the light guide through the optically smooth surface.

12. The device of claim 10, wherein said different configurations correspond to different notch angles.

13. The device of claim 10, wherein said light guide is a light fiber.

14. The device of claim 10, wherein said light guide has a circular cross-sectional shape.

15. The device of claim 10, wherein said light guide is a planar light guide.

* * * * *